United States Patent [19]

Yamaguchi

[11] Patent Number: 5,025,489
[45] Date of Patent: Jun. 18, 1991

[54] TRANSFORMER HAVING SHIELDING WALL FOR DRIVING A MAGNETRON

[75] Inventor: Kimiaki Yamaguchi, Nara, Japan

[73] Assignee: Matsushita Electric Industrial Co., Ltd., Osaka, Japan

[21] Appl. No.: 540,870

[22] Filed: Jun. 19, 1990

Related U.S. Application Data

[63] Continuation of Ser. No. 194,281, May 16, 1988, abandoned.

[30] Foreign Application Priority Data

May 14, 1987 [JP] Japan .................................. 62-117337
May 14, 1987 [JP] Japan .................................. 62-117342

[51] Int. Cl.$^5$ ........................ H05B 6/76; H01F 15/04
[52] U.S. Cl. ..................... 219/10.55 B; 219/10.55 D; 336/84 C; 174/35 R; 361/424
[58] Field of Search .................. 219/10.55 R, 10.55 B, 219/10.55 D; 336/84 C, 84 R, 84 M; 174/35 R, 35 MS; 361/424; 323/355, 359, 362

[56] References Cited

U.S. PATENT DOCUMENTS

| | | | |
|---|---|---|---|
| 946,193 | 1/1910 | Bachelet | 336/84 M |
| 1,320,980 | 11/1919 | Bowman | 336/84 C |
| 1,651,972 | 12/1927 | Hughes | 336/84 C |
| 2,512,737 | 6/1950 | Carlson | 336/84 C |
| 3,851,287 | 11/1974 | Miller et al. | 336/84 C |
| 4,089,049 | 5/1978 | Suzuki et al. | 336/84 C |
| 4,156,829 | 5/1979 | Harada | 219/10.55 D |
| 4,308,512 | 12/1981 | Capecchiacci et al. | 336/84 C |
| 4,660,014 | 4/1987 | Wenaas et al. | 336/84 C |

Primary Examiner—Philip H. Leung
Attorney, Agent, or Firm—Wenderoth, Lind & Ponack

[57] ABSTRACT

A stationary induction apparatus for supplying and receiving high frequency power of several tens KHz, wherein a partition wall made of a non-magnetic metallic foil in a thickness less than 1/10 the depth of penetration in the using freqency for electromagnetic induction is provided so as to separate the supply side (primary side) from the receiver side (secondary side), so that the stationary induction apparatus is not hurt in its function as an induction apparatus, but can electromagnetically shield the primary side from the secondary side, and the secondary side of the boosting transformer of the magnetron is able to be placed within the shield casing, thus realizing a light, compact and inexpensive microwave generating device for use in an electronic oven.

16 Claims, 12 Drawing Sheets

TRANSFORMER HAVING SHIELDING WALL FOR DRIVING A MAGNETRON

This application is a continuation of now abandoned U.S. application Ser. No. 07/194,281 filed on May 16, 1988.

BACKGROUND OF THE INVENTION

1. Field of the Invention

The present invention generally relates to a stationary induction apparatus for transmitting or supplying electromagnetic energy through electromagnetic induction, and more particularly, to a high-frequency heating apparatus to which is applied a technique to electromagnetically shield the power supply side of the stationary induction apparatus (primary side) from the power receiver side (secondary side), without detracting from the electromagnetic induction function therebetween.

2. Description of the Prior Art

Due to the recent progress in inverter technology, an inverter source system is now being put into practical use. According to this inverter source system, commercial frequencies are, before being boosted by a boosting transformer and added to a magnetron, converted into high frequencies. Therefore, if the inverter source system is applied to an electronic oven, a power source of the magnetron of the electronic oven can be rendered compact in size, light in weight and low in manufacturing cost.

Attempts have been made to construct such a microwave generating device for use in an electronic oven (a high frequency heating apparatus) that is light in weight and compact, wherein the primary side coil (power supply side induction element) of the boosting transformer (stationary induction apparatus) is positioned outside a shield casing, while the secondary side coil (power receiver side induction element) is placed inside the shield casing of the magnetron, so that the primary side coil and the secondary side coil are inductively coupled to each other to function as a transformer, and wherein the primary side coil and the secondary side coil are separated from each other by the shield casing, thereby to maintain the shielding function of the shield casing.

In the electronic oven using the above-described system of the inverter power source, the high frequency waves of several tens of KHz produced in the inverter circuit can be advantageously utilized as they are for induction heating. Therefore, if a heating coil for induction heating is added to the electronic oven employing the inverter power source, and the power is arranged to be supplied from the common inverter power source either to the heating coil or to the microwave generating device, an electronic oven equipped with the function of an electromagnetic cooking apparatus which can serve both as an electronic oven and as an electromagnetic cooking apparatus will be brought into the market. In this case, although it may be possible to install the heating coil for electromagnetic cooking on the upper surface of the body of the electronic oven, it will be more convenient to place the heating coil at the bottom, inside the heating chamber, of the electronic oven, so that the room of the heating chamber can be a common space for an object to le heated by the electronic oven and by the electromagnetic cooking apparatus. However, if the heating coil is placed within the heating chamber where the microwave is irradiated, the exciting coil should be protected from damages caused by the microwave, and for this purpose the exciting coil is necessary to be shielded from the microwave, while the exciting coil which is an induction element at the power supply side is necessary to be inductively coupled to a metallic pan or the like (an object to be heated) which corresponds to an induction element at the power receiver side.

Both in the above-described microwave generating device and in the electronic oven functioning also as an electromagnetic cooking apparatus, the electromagnetic waves should be shielded between the power supply side and the power receiver side, but, the high-frequency power of several tens of KHz should be transmitted through electromagnetic induction between the power supply side and the power receiver side. The above-described shielding and transmission of electromagnetic energy are contradictory from a physical viewpoint, and accordingly conventional techniques could not realize such ideas as the above microwave generating device or the electronic oven with the electromagnetic cooking apparatus.

SUMMARY OF THE INVENTION

An essential object of the present invention is to provide a stationary induction apparatus wherein an induction element at the power supply side (the primary side circuit) and an induction element at the power receiver side (the secondary side circuit) are electromagnetically shielded from each other by a partition wall made of a metallic foil having a thickness less than 1/10 the depth of penetration in the operating frequency (several tens of KHz), making use of the fact that the frequency of the electromagnetic wave necessary to be shielded is generally higher than the several tens of KHz which is used for transmission of the energy through electromagnetic induction.

The stationary induction apparatus according to the present invention is applicable to those described in the item of "Description of the Prior Art". In other words, a microwave generating device in the high frequency heating apparatus is one example. More specifically, in the microwave generating device, the secondary side of the boosting transformer (stationary induction apparatus) for supplying positive voltage (high voltage) and heater voltage (low voltage) to the magnetron is electromagnetically shielded from the primary side of the boosting transformer, through combination of the inverter power source, so that the leakage of unnecessary electromagnetic waves from the cathode stem connected to the secondary side is prevented. Accordingly, the stationary induction apparatus of the present invention can achieve a highly efficient, light in weight and compact microwave generating device.

A second application example is an electronic oven which can serve also as an electromagnetic cooking apparatus, which has the heating coil placed in the bottom inside portion of the heating chamber. According to the arrangement of this case, the heating coil which is an induction element at the power supply side is electromagnetically inductively coupled to a metallic pan (an object to be heated) which corresponds to an induction element at the power receiver side, while the heating coil including the plane facing the pan and he heating coil is electromagnetically shielded from the microwaves, so that the heating coil is not damage by the microwaves.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENTS

Figure 1:
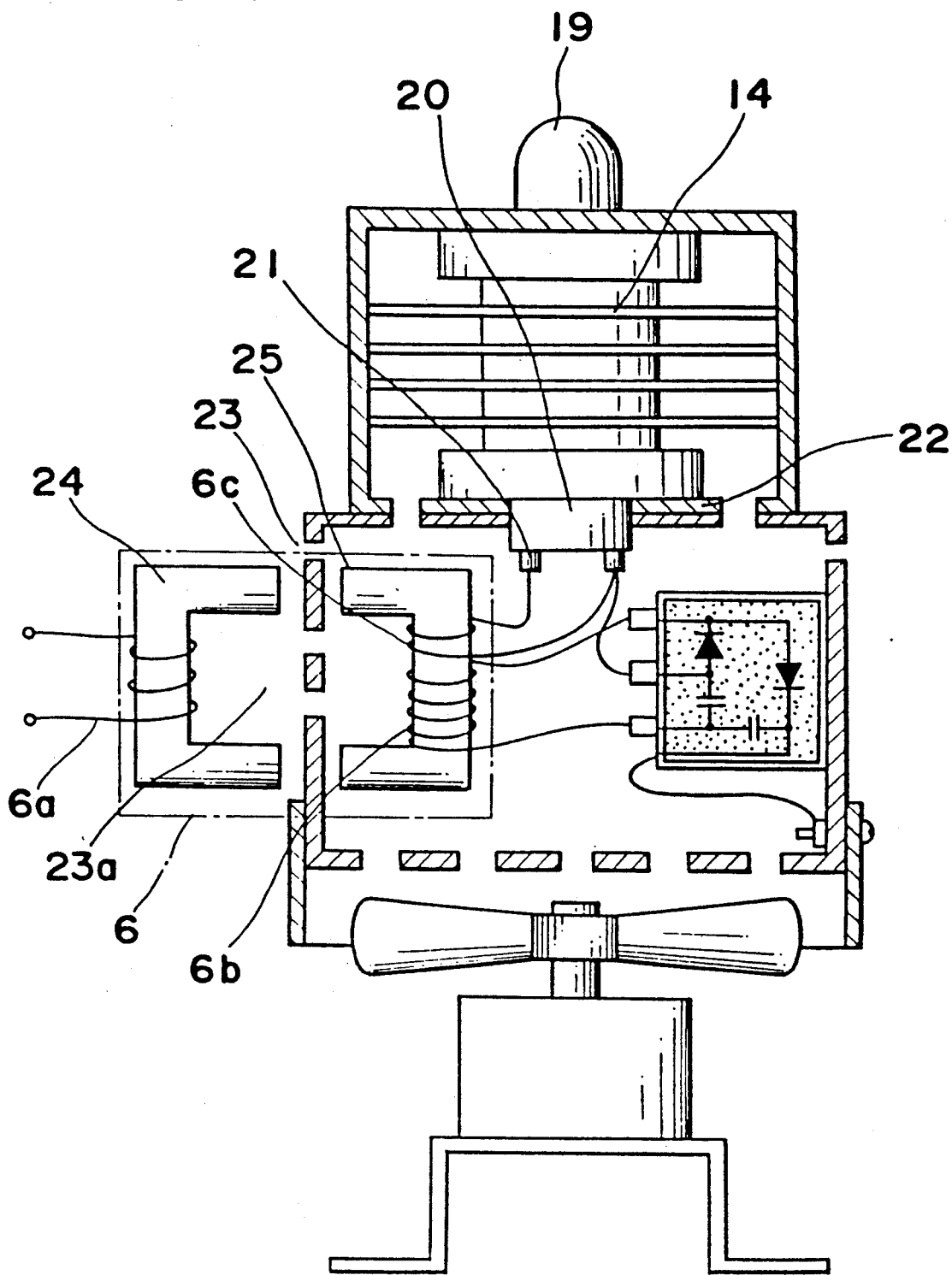
FIG. 1 is a cross sectional view of a conventionally proposed microwave generating device which is comprised of a magnetron using an inverter power source and its power circuit.

Before the description of the present invention proceeds, it is noted here that like parts are designated by like reference numerals throughout the accompanying drawings.

Also, before beginning the description of the present invention, a description is provided first with reference to the disclosure in Japanese Utility Model Laid-Open Publication No. 61-107190 (107190/1986) as to how the shielding of the microwaves and the transmission of the power through electromagnetic induction could not be technically achieved all together heretofore according to the conventional methods.

Generally, a filter circuit is formed in the magnetron by a choke coil provided within a shielding casing covering a cathode stem of the magnetron and a through capacitor, so as to prevent leakage of the electromagnetic waves from an input terminal side, namely, the cathode stem side. However, when an inverter power source using, for example, a frequency of over 20 KHz, the power which is inverted into high-frequency waves by the inverter is unfavorably controlled by the filter circuit and therefore, becomes difficult to be supplied to the magnetron. FIG. 1 shows a cross sectional view of an essential portion of a conventional microwave generating device using the inverter power source disclosed in the above Japanese Utility Model Laid-Open Publication No. 61-107190, which is proposed for the purpose of solving the above-described disadvantage. In the microwave generating device of FIG. 1, an oscillator tube 14 has an antenna 19 at one end thereof, and a cathode stem 20 at the other end which has cathode terminals 21 and 22. The cathode stem 20 is surrounded by a shield casing 23 which is electrically connected to the oscillator tube 14 and formed by a non-magnetic conductive material. The shield casing 23 is completely shielded between the inside and the outside of the casing electromagnetically. A primary side core 24 wound by a primary side winding 6a of a boosting transformer 6 is positioned outside the shield casing 23 opposite to a secondary side winding 6b and a low voltage secondary side winding 6c inside the shield casing 23, via wall surface 23a. In the instant reference, the primary side core 24 and the secondary side core 25 are so positioned via the wall surface 23a as to be electromagnetically coupled to each other through mutual induction. Accordingly, the high frequency waves can be prevented from leaking from the side of the input stem of the magnetron, and simultaneously the power converted into high frequency waves can be supplied to the magnetron. However, although it appears that the above-described arrangement functions as explained, practically, the construction is merely a desk theory that is impossible to be achieved, the reason for which will be described hereinbelow.

According to the description of the abovementioned Japanese Utility Model Laid-Open Publication, the shield casing 23 surrounding the cathode stem 20 provided at one end of the oscillator tube 14 is formed by a nonmagnetic conductive material, and the primary side and the secondary side of the boosting transformer are placed outside and inside the shield casing 23 via the wall surface 23a. In this case, it is true that the leakage of the high frequency waves from the cathode stem 20 can be prevented, but the primary side and the secondary side of the boosting transformer are shielded at the same time and therefore, the electromagnetic energy cannot be transmitted to the magnetron. Therefore, such a position or arrangement of the primary side and the secondary side of the boosting transformer cannot be present that is able to achieve electromagnetic coupling therebetween through mutual induction. This is because, since the wall surface 23a of the shield casing 23 is formed by a conductive material, the magnetic field produced by the high frequency current running in the primary winding 6a of the boosting transformer 6 generates an induced current in the wall surface 23a, that is, an eddy current, and the electric energy of the magnetic field is consumed as Joule heat by this eddy current. As a result, the electric energy is never transmitted to the secondary side windings 6b and 6c of the boosting transformer 6, or is attenuated on a large scale. From another viewpoint, the shield casing 23 made of a conductive material is equivalent to that a third secondary winding which is short-circuited and which is added to the boosting transformer 6. Therefore, it may be so considered that the electric energy of the magnetic field is almost entirely consumed by the short-circuited current flowing in the short-circuited secondary winding. In any case, the conventional arrangement is merely non-workable idea, since the shield casing 23 has a function which is impossible to achieve by conventional means or measures.

In order to eliminate or solve the above-described disadvantages inherent in the prior art, the present invention provides a shielding technique to be applied to a high-frequency heating apparatus installed with a stationary induction apparatus, whereby the power supply side (the primary side) of the stationary induction apparatus can be shielded from the power receiver side (the secondary side) electromagnetically, without detracting from the electromagnetic induction function therebetween.

Although various modes can be considered for practicing the present invention, some will be described one by one with reference to their embodiments.

A first embodiment is related to a magnetron and its boosting transformer, the construction and the operation of which will be described with reference to FIGS. 2 to 5.

Figure 2:
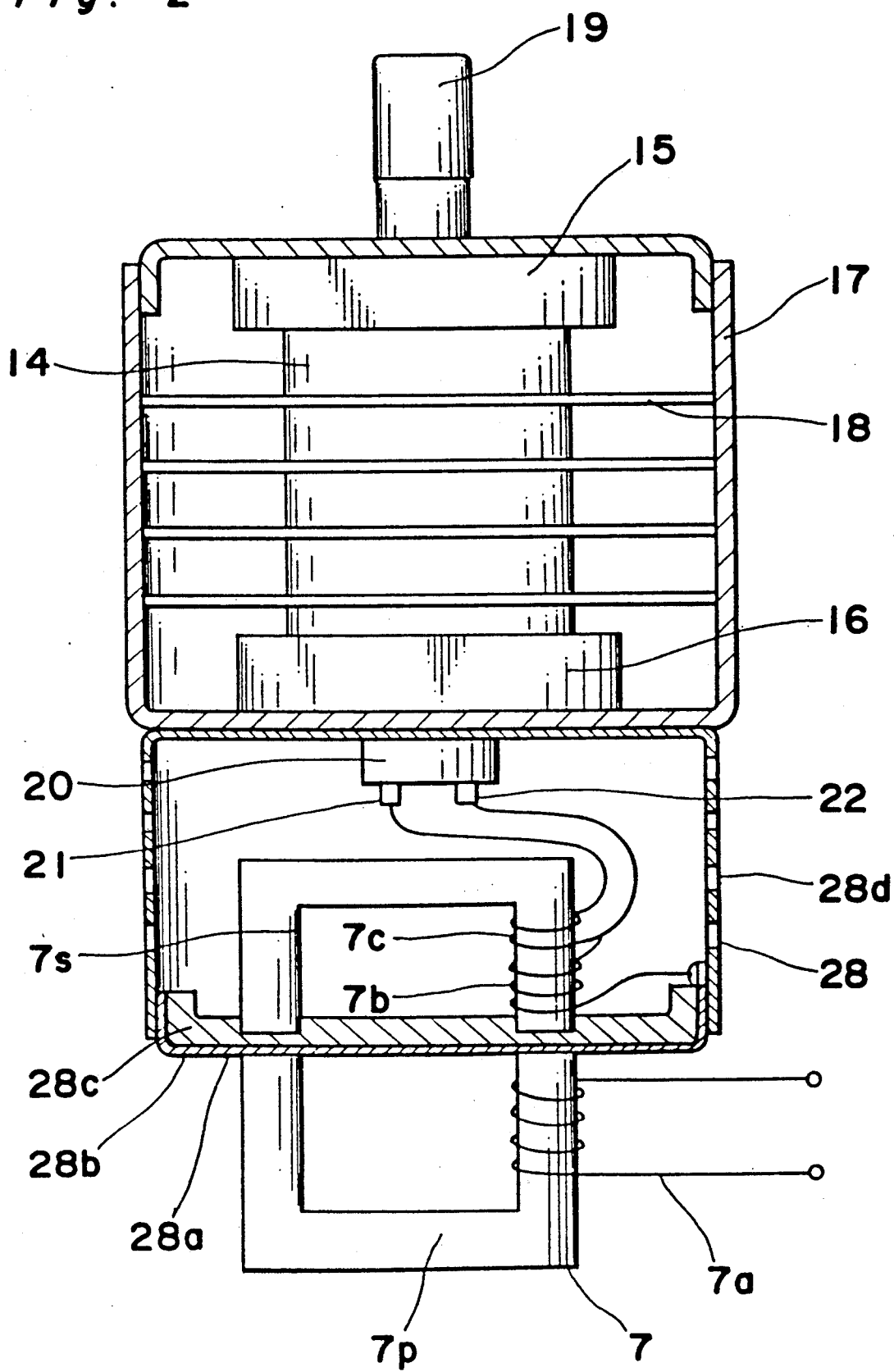
FIG. 2 is a cross sectional view of an example of a microwave generating device utilizing an inverter power source and mounted with a stationary induction apparatus according to the invention.
Figure 3A:
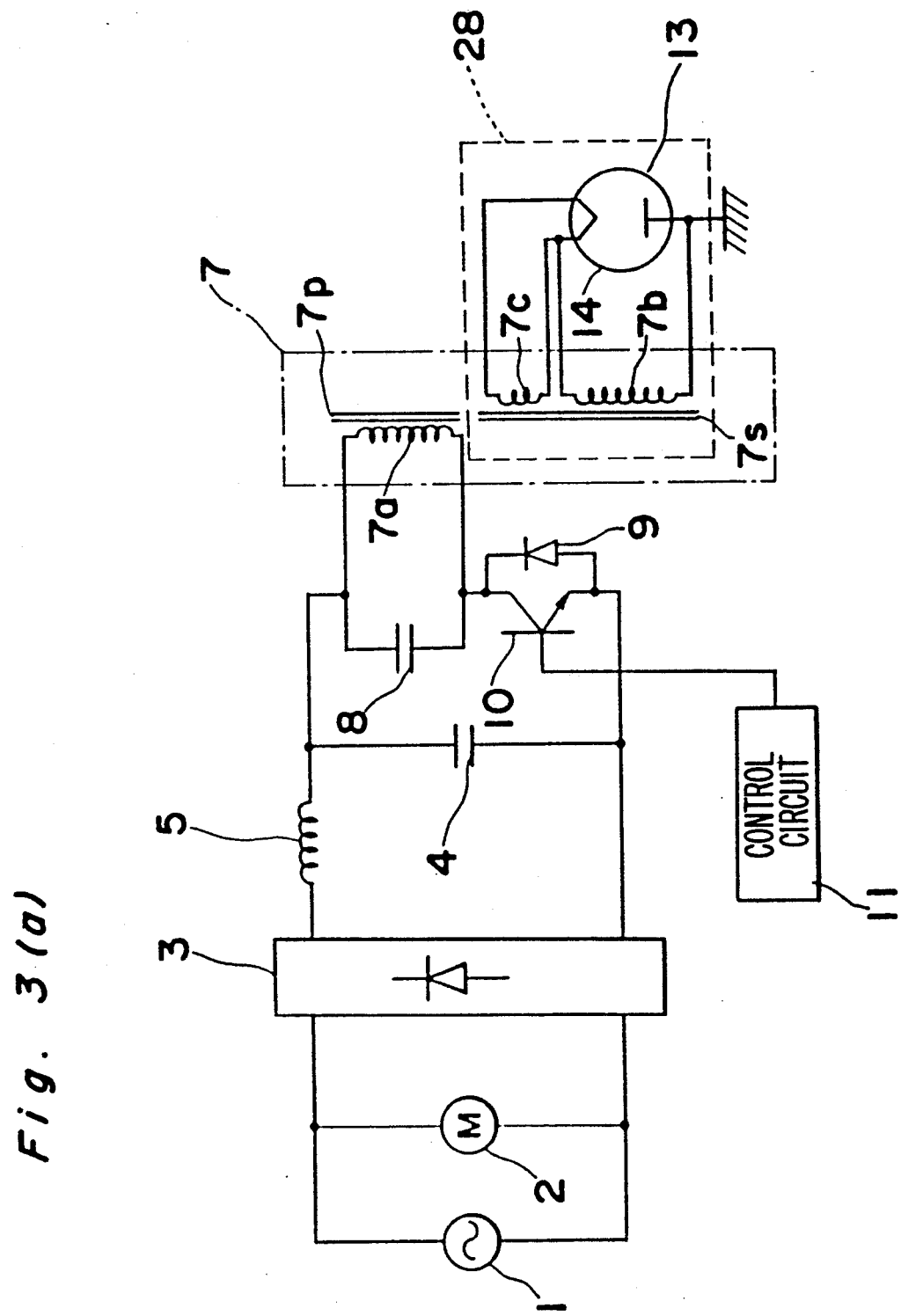
FIGS. 3(a) and 3(b) are circuit diagrams showing the circuit construction of the microwave generating device of FIG. 2.

In FIG. 2, there is shown a cross sectional view of an essential portion of a high frequency heating apparatus which includes a stationary induction apparatus according to the first embodiment of the present invention. FIG. 3(a) is a circuit diagram schematically showing the circuit construction of the high frequency heating apparatus including the essential portion shown in FIG. 2.

Referring to FIG. 3(a), an electric power at commercial frequencies supplied by a power source 1 is rectified by a rectifier circuit 3, and then supplied to an inverter circuit comprising a capacitor 8, a diode 9 and a transistor 10 which is a switching element, through a low-pass filter composed of an inductance 5 and a capacitor 4. The transistor 10 is turned on and off by a high frequency pulse generated from a control circuit 11.

After the power is converted into a high frequency wave of approximately 20 KHz by the inverter circuit and supplied to a primary winding 7a of a boosting transformer 7, it is excited at a secondary winding 7b as the anode voltage of the magnetron and at a secondary winding 7c as the cathode voltage of the magnetron, respectively, to inputted to the magnetron 13. In FIG. 2, an oscillator tube 14 is a main body of the magnetron, which has an antenna 19 at one end and a cathode stem 20 at the other end. A shield casing 28 enclosing the cathode stem 20 has a lid 28a which is a part of the wall surface of the casing and composed of a shield film 28b of a non-magnetic metallic thin film or a metallic evaporated film, and a support member 28c made of a dielectric material which supports the shield film 28b.

The boosting transformer 7 has its core divided by the lid 28a of the shield casing 28 to be positioned inside and outside of the casing 28. A primary side core 7p outside the shield casing 28 is wound with a primary winding 7a, and a secondary side core 7s inside the shield casing 28 is wound with secondary windings 7b and 7c. Generally the core is made of ferromagnetic material. As has been already mentioned above, the primary winding 7a is supplied with the voltage converted into high frequency by the inverter circuit, while the high voltage and the low voltage generated respectively in the secondary windings 7b and 7c are, through cathode terminals 20 and 21, inputted as the anode voltage and the cathode voltage to the magnetron, respectively.

The shielding effect of the shield casing 28 and the operation of the boosting transformer 7 will be explained hereinbelow.

Generally, when a conductive member which is represented by metal is applied with an alternating magnetic field, whether it is magnetic or non-magnetic, an induced current is produced. The depth by which the induced current penetrates from the surface is limited, and the depth when the current density I becomes 1/e of the surface current density Io is called as the depth of penetration $\rho(m)$ which establishes an equation $\delta = \sqrt{\rho/\pi f \mu}$, wherein $\rho$ is a specific resistance of the conductor (ohm.m), f(Hz) is frequency and $\mu r$ is a specific magnetic permeability.

In general, the current density I in the conductor at a position spaced the surface is expressed by an equation, $I = Io \cdot e^{-x/\delta}$ wherein Io represents the current density on the surface. Attenuation of the magnetic field is proportional to the attenuation of the current, and the attenuation ratio A (dB) is expressed as follows, $$A = 20 \log \frac{Ha}{H} = 20 \log \frac{Io}{I} = 8.686 x \frac{x}{\delta} \text{ dB}$$

Accordingly, for example, in the case of an aluminum plate, the depth of penetration $\delta$ is 0.6 mm or so in the frequency of 20 KHz. Even if the aluminum plate is as thin as about 0.6 mm, the attenuation ratio A is 8.686 dB. Thus, the alternating magnetic field applied to one surface of the aluminum plate hardly penetrates to the opposite surface, and almost all of which is consumed as an ohmic loss by the induced current in the aluminum plate.

However, if an aluminum leaf or foil, rather than a plate, having thickness being 20 μm is employed, this thickness of 1/30 of $\delta = 0.6$ mm (600 μm) which is the depth of penetration at 20 KHz frequency the attenuation ratio A becomes 0.3 dB. Accordingly, contrary to the above case of the aluminum plate, the energy can be transmitted to the opposite surface to nearly a full scale (97%).

Figure 4:
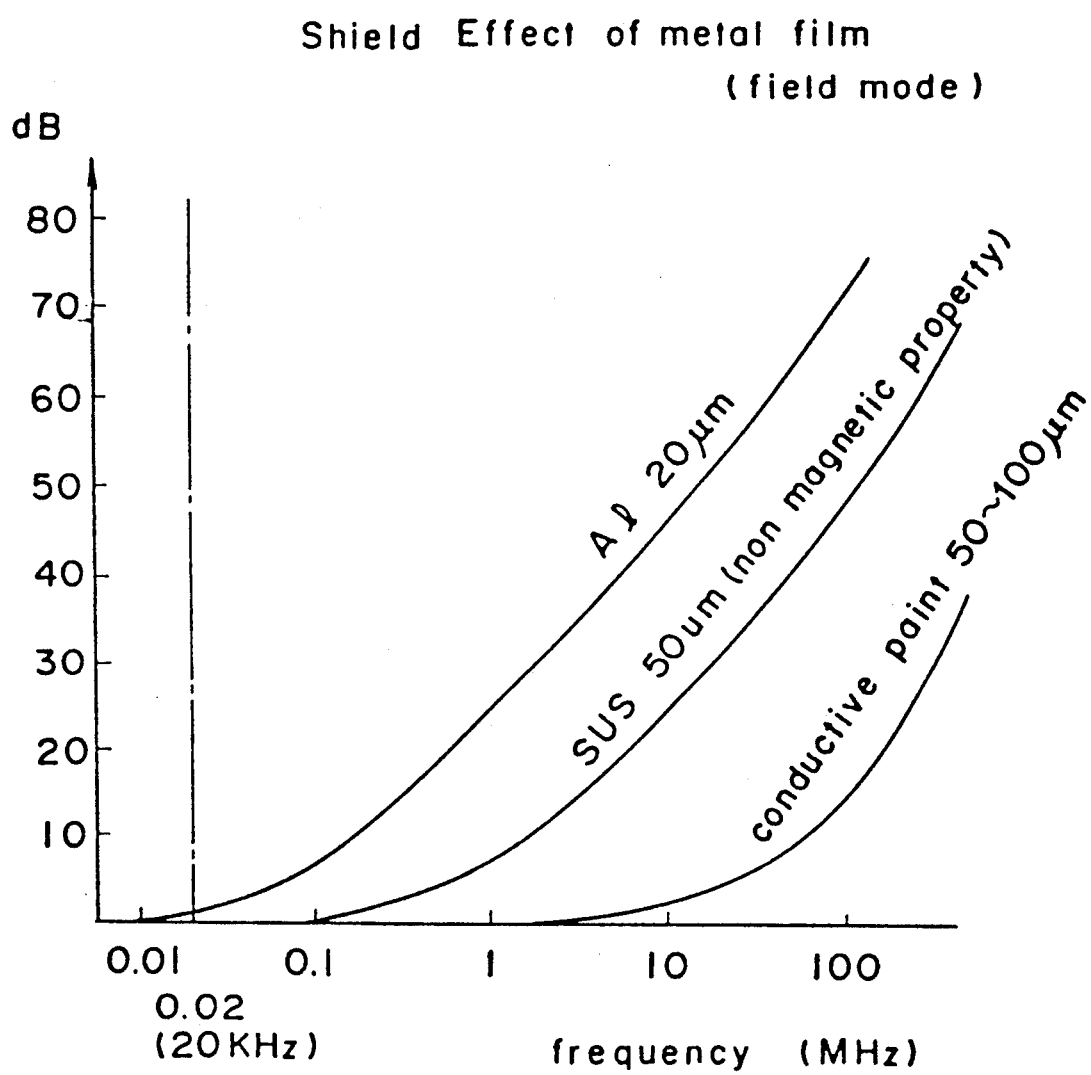
FIG. 4 is a graph showing shielding characteristics of metallic foils in the alternating magnetic field.

FIG. 4 indicates how the shielding rate with respect to the alternating magnetic field of the metallic foil or the conductive coating film is changed in accordance with the frequency. As is clear from the graph of FIG. 4 and also from the equation $\delta = \sqrt{\rho/\pi f \mu}$, the depth of penetration $\delta$ becomes smaller in accordance with the increment of the frequency f, thereby increasing the shielding effect of the metallic foil or the conductive coating film.

In the case where a metallic thin film, that is, non-magnetic stainless steel L(SUS) having a thickness of 50 μm i employed for the shielding film 28b, it can be said that the metallic thin film displays no shielding effect at all with respect to the alternating magnetic field having a frequency of less than 100 KHz. Consequently, the boosting transformer 7 perfectly serves as a transformer even though the primary side and the secondary side thereof are divided by the lid 28a. In the meantime, noises generated by the magnetron are spread widely among the low frequency region as well as to the basic frequency region of 2450 MHz. It is the high frequency region of over 10 MHz that is essentially necessary to be shielded, even if the shield film 28b is a metallic foil of non-magnetic stainless steel (SUS) 50 μm, a shielding effect is achieved of over 25 dB (magnetic field mode) and moreover, the shielding efficiency increases as the frequency becomes higher. It is to be noted here that the windings of the transformer are coupled to each other by the alternating magnetic field, and the data indicated in FIG. 4 is obtained in the magnetic field mode. However, it is made clear by experiments that, when the same 50 μm non-magnetic stainless steel (SUS) in the shape of a foil is employed in the electric field mode, the shielding effect having the attenuation ratio over 40 dB is achieved, including in the frequency region less than 10 MHz. Therefore, with respect to the electromagnetic waves leaking from the cathode stem 20 which should be prevented, actual effective shielding is exercised in the middle of the magnetic field mode and the electric field mode, and accordingly the non-magnetic stainless steel is sufficiently effective as the shield film for prevention of leakage of the high frequency waves.

Although the thickness of the shield film 28b is determined with consideration of the boosting transformer 7 and the shielding characteristic, etc., the loss in the shield film 28b should be also considered, and therefore a standard thickness of the shield film 28b is less than 1/10 the depth of penetration δ.

In the case where the shield film 28b has the thickness 1/10 the depth of penetration δ, the attenuation ration A is approximately 10%, in accordance with the earlier-described equation $$A = 8.686 \times x/\delta \text{ (dB)},$$

that is, A = 0.8686 dB.

On the, contrary, the minimum thickness of the shield film is determined by the lowest frequency to be shielded and the shielding characteristic (attenuation ratio) to be required. Although the unnecessary radiation leaking from the cathode stem 20 of the magnetron 13 includes not only the high frequency region around 2450 MHz, but also the low frequency region, the lowest frequency for which the high shielding effect of the shield casing is approximately 20 MHz. Supposing that the inverter frequency is 20 KHz, the above-mentioned lowest frequency 20 MHz is 1000 times the inverter frequency, and the depth of penetration is approximately 1/30. Accordingly, if the shield film is made of aluminum, the depth of penetration is 0.02 mm (20 μm) in the 20 MHz frequency which is 1/30 the depth of penetration 0.6 mm in the 20 KHz frequency, which will be the standard thickness of the shield film. In practice, however, for maintaining the transmission loss as low as possible in the stationary induction apparatus, the shielding characteristic may be sacrificed a little, and a thinner shielding film, namely, a shielding film having 1/100 or 1/200 the depth of penetration in the inverter frequency is employed in many cases.

As will be understood from the description above, according to the first embodiment of the present invention, the shield casing 28 is able to prevent leakage of the high frequency waves from the cathode stem of the magnetron, and at the same time, the boosting transformer 7, even though it is divided by the wall surface of the shielding casing 28, is able to perform its function as a transformer.

If the conventional boosting transformer which steps up the commercial frequency as it is employed for treating general power, for example, of about 1 KW or so, since the conventional boosting transformer is almost an iron block having 4 Kg in weight and 110×110×70 mm in outer dimension which is considerably heavier and bulkier as compared with the magnetron having 1 Kg in weight and 100×100×50 mm in outer dimension, not only the whole power source circuit becomes large in weight and size, but the boosting transformer is impossible to be integrally formed with the shield casing of the magnetron. On the contrary, according to the present invention, because the power is converted into high frequency waves of several tens of KHz by the high frequency inverter circuit, and moreover, the material of the magnetic core is changed from a plate-like silicon steel to ferrite, a light and compact structure of the boosting transformer, i.e., 400 g in weight and 70×70×40 mm in outer dimension, can be realized, so that the boosting transformer is able to be integrated with the shield casing of the magnetron.

If the shield film is made of a magnetic metal, the shield film unfavorably forms a branching circuit (shunt circuit) in the magnetic circuit of the boosting transformer 7, resulting in a reduction of the magnetic property. Therefore, it is preferable to use a non-magnetic metal such as aluminum, etc. for the shield film as described above. However, if a non-magnetic material such as represented by copper (Cu) or aluminum (Al) is employed, the depth of penetration δ becomes small because of the small specific resistance (ohm.m) thereof, giving rise to a trouble in processing. Therefore, the material of the shield film should be decided carefully with the above-described facts taken into consideration. For example, Monel (an alloy mainly composed of nickel and copper) can be said to be suitable for the material of the shield film since it is non-magnetic, but has relatively large specific resistance.

Further, in order to lessen the eddy current loss by the magnetism leaking from the boosting transformer, it is preferable that the other shield wall surface of the shield casing 28, except the shield film 28b, is made of, for example, aluminum which shows good electric conductivity, and is non-magnetic metal. The thickness of the wall surface is desirably over 0.6 mm which is the depth of penetration in the inverter frequency (20 KHz) of aluminum.

A ventilation hole 28d is formed in the surface of the shield casing 28 so as to cool the secondary side of the boosting transformer 7. The secondary side is forcibly cooled by a cooling fan 2 from outside of the shield casing 28.

Figure 3B:
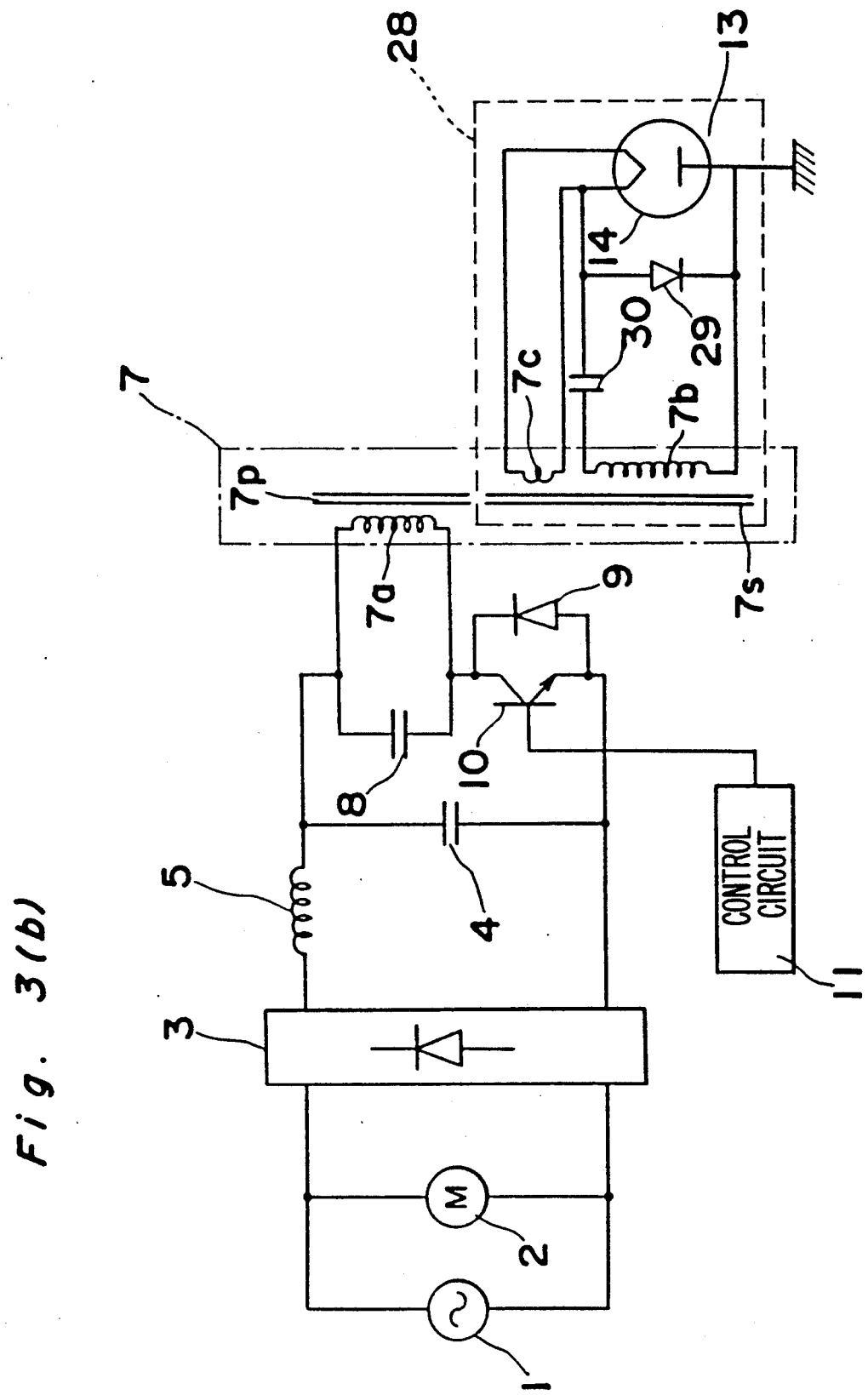

Although it is so arranged in the present embodiment that the voltage at the secondary side of the boosting transformer is added to the magnetron as it is as an anode voltage, the voltage at the secondary side may be doubled and rectified by a diode and a capacitor, or subjected to the full wave rectification by many diodes, and then added to the anode electrode. Of course, various types of circuit constructions may be possible. In the circuit constructions described above, such circuit elements as the diode, the capacitor, etc. are naturally placed inside the shield casing. FIG. 3(b) shows one example of such circuit construction as above, in which a diode 29 and a capacitor 30 constitute a voltage doubler circuit.

As is described hereinabove, the following effects can be achieved by the microwave generating device installed with the stationary induction apparatus of the present invention.

(1) The microwaves leaked from the cathode stem of the magnetron and the high frequency wave noises accompanied with the leakage of the microwaves are shielded within the shield casing, whereas the secondary side circuit of the boosting transformer inside the shield casing is able to be magnetically coupled to the primary side circuit outside the shield casing, thereby effecting the function as a transformer. As a result, the power which is converted into high frequency waves by the inverter can be effectively supplied by the magnetron.

(2) When the conventional boosting transformer which steps up the commercial frequency as it is employed to handle quite general power, for example, about 1 KW, the boosting transformer is impossible to be integrally formed with the magnetron since the boosting transformer is as heavy as over 4 Kg, that is, four times the weight of the magnetron and, the outer dimension of the boosting transformer is very large. However, due to the high frequency inverter employed, since the power, is converted into high frequency waves of several tens of KHz according to the present embodiment, and moreover, the magnetic core is changed from silicon steel plate to ferrite according to the present embodiment, the microwave generating device is realized in a substantially compact structure, 400 g in weight and small, wherein the boosting transformer and the magnetron are integrally formed.

(3) A filter circuit composed of an inductance and a capacitance (a through capacitor) which is provided in the prior art shield casing for avoiding leakage of high frequency wave noises is not necessary in the present embodiment. Accordingly, the voltage decrease and the power loss caused by the filter circuit are solved. At the same time, since the capacitance (through capacitor) and the inductance which are necessary to be high in pressure resisting property and accordingly expensive because the anode voltage is as high as about 4KV can be solved, the manufacturing cost of the apparatus can be substantially reduced.

Figure 5:
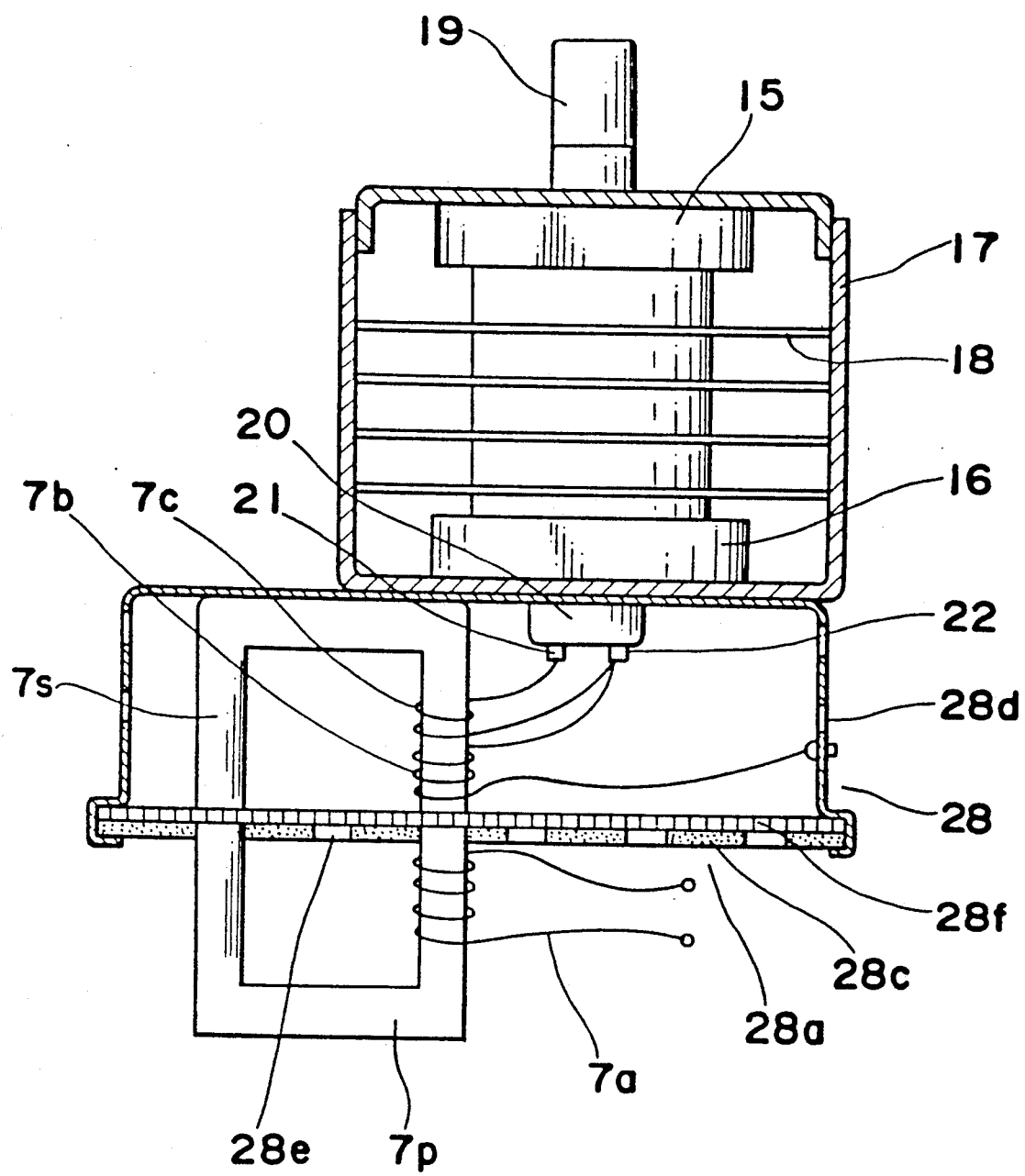
FIG. 5 is a cross sectional view of a second example of a microwave generating device utilizing an inverter power source and installed with a stationary induction apparatus according to the present invention.

Similarly to the first embodiment, a second embodiment is related to the magnetron and the boosting transformer. The difference resides in the structure of a shielding wall provided between the primary side (power supply side induction element) and the secondary side (power receiver side induction element) of the boosting transformer. With reference to FIGS. 5 through 7, the difference of the second embodiment from the first embodiment will be described.

FIG. 5 is a cross sectional view of an essential portion of a microwave generating device utilizing the inverter power source and installed with a stationary induction apparatus (boosting transformer) according to the second embodiment.

In the construction of FIG. 5, the lid 28a which is a part of the wall surface of the shield casing 28 enclosing the cathode stem 20 is constructed by a honeycomb core 28f made of aluminum foil and a supporter 28c made of a dielectric material for supporting the honeycomb core 28f. The construction of the lid 28a of the second embodiment is different from that of the first embodiment shown in FIG. 2.

With reference to FIG. 6, the structure of the aluminum honeycomb core 28f will be described in detail.

Figure 6A:
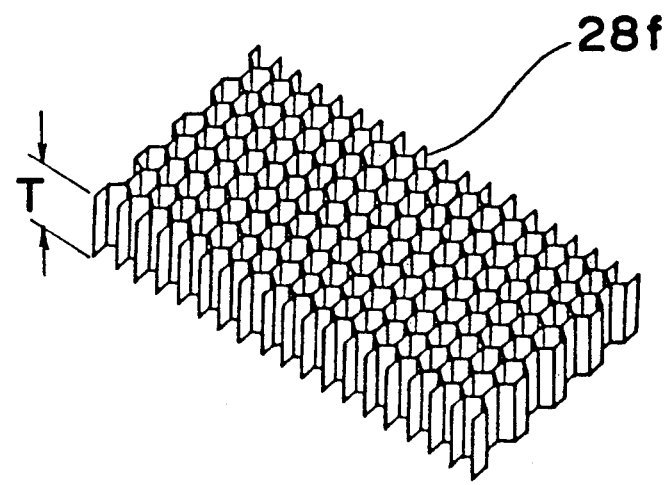
FIGS. 6(a) and 6(b) are a perspective view and an enlarged plan view of a honeycomb core constituting an essential part of the microwave generating device of FIG. 5.
Figure 6B:
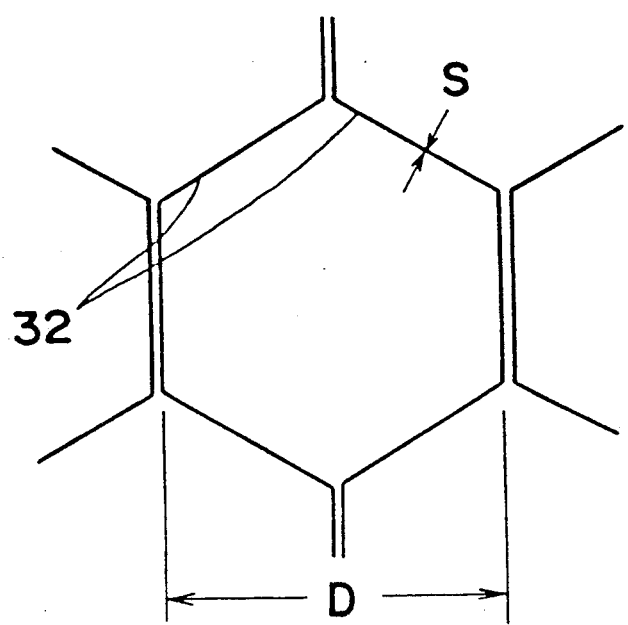

FIG. 6(a) is a perspective view of a part of the aluminum honeycomb core 28f cut out in general rectangular shape, and FIG. 6(b) is an enlarged view of one (unit structure) of the cells composing the aluminum honeycomb core 28f. As seen from FIG. 6(b), the core 28f is formed by many hexagonal cells by attaching a plurality of aluminum foils as shown. The honeycomb core 28f has a relatively large mechanical strength in spite of its small weight. Moreover, the honeycomb core 28f exhibits shielding effects against electromagnetic waves while the gas permeability, thereof is maintained. Accordingly, the honeycomb core has been put into wide use, for example, in a ventilation window of a shield room for shielding of electromagnetic waves, etc. According to the second embodiment, the aluminum foil thickness S of the honeycomb core 28f is, in the case where the inverter frequency is 20 KHz, below 1/10 of the depth of penetration 0.6 mm of the aluminum with respect to the above frequency. The cell size D and the core height T of the honeycomb core 28f are set on the basis of the largest frequency of the unnecessary radiation to be shielded, and in the second embodiment, the core height T is 1.5 mm and the cell size D is approximately 3 mm.

Hereinafter, the operation of the microwave generating device having the above-described construction according to the second embodiment of the present invention will be described. First, the function of the boosting transformer will be explained with reference to FIG. 7.

Figure 7A:
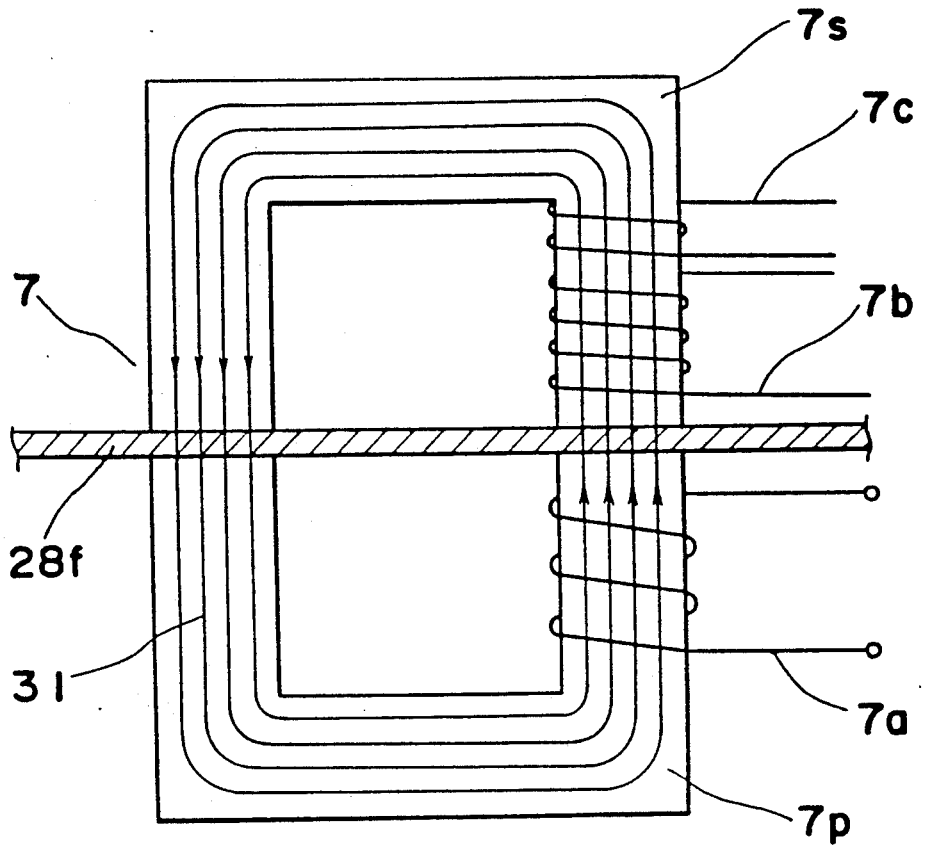
FIGS. 7(a) to 7(c) are diagrams explaining the operation of the honeycomb core of FIG. 6.
Figure 7B:
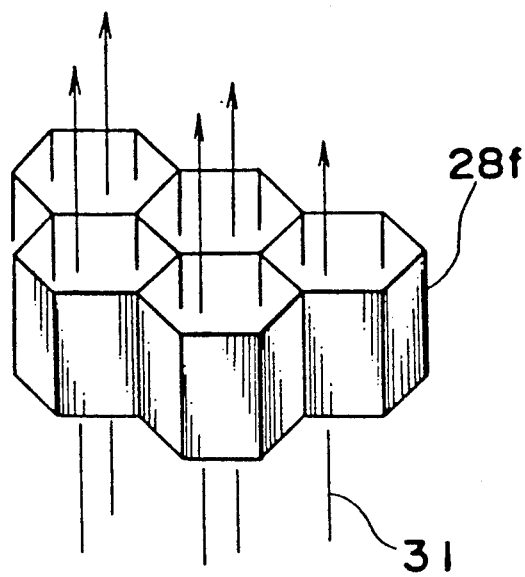

FIG. 7(a) indicates the relation of the honeycomb core 28f made of the aluminum foil 32, the boosting transformer 6 which is separately arranged by the honeycomb core 28f outside and inside the shield casing 28, and the line 31 of magnetic flux in the high frequency magnetic field of 20 KHz which is generated when the boosting transformer 7 is driven. FIG. 7(b) is an enlarged view showing the relation between the honeycomb core 28f and the line of magnetic flux 31. The line of magnetic flux 31 is generally parallel to the axial direction of each cell (unit structure) forming the honeycomb core 28f.

As has been described in the first embodiment, generally, an electric conductor which is represented by metal, when applied with an alternating field, generates an induced current, whether the conductor is magnetic or non-magnetic. The induced current penetrates from the surface of a limited depth. The depth when the current density I becomes 1/e of the surface current density Io is called as the depth of penetration $\delta(m)$. And the depth of penetration $\delta(m)$ is expressed by an equation:

$$\delta = \sqrt{\rho/\pi f \mu}$$

wherein $\rho$(ohm.m) is a specific resistance of the conductor, f(Hz) is a frequency and $\mu r$ is a specific permeability. The current density I in the conductor at a position x from the surface is expressed:

$$I = Io \cdot e^{-x/\delta} \tag{1}$$

wherein Io is the current density at the surface. By way of example, when the conductor is aluminum, the depth of penetration $n\delta$ is approximately 0.6 mm when the frequency is 20 KHz. The direction of the induced current is vertical to the direction of the magnetic field (the line of magnetic flux 31).

Figure 7C:
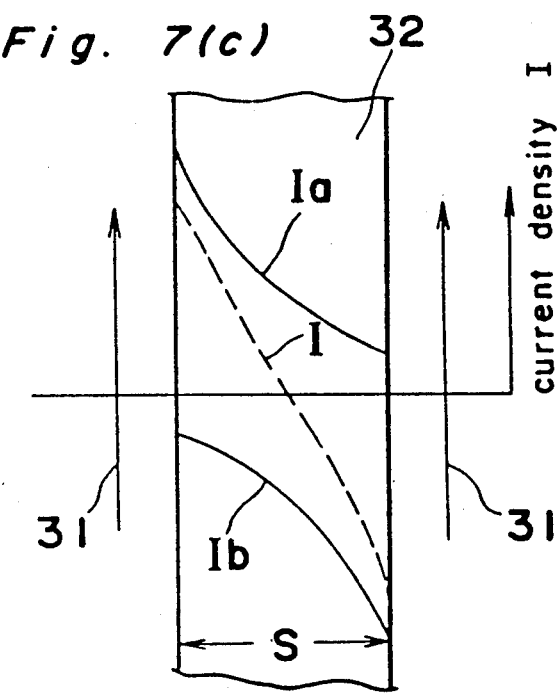

FIG. 7(c) shows the relation of the aluminum foil 32 having the thickness S, the line of magnetic flux 31 in the alternating field added parallel to the aluminum foil 32, and the induced current produced in the aluminum foil 32. The current induced into the aluminum foil is exponentially and functionally decreased from the surface, as indicated by equation (1). The direction of the current induced in the aluminum foil 32 is vertical to the magnetic field, and moreover, the current density is Ia and Ib, opposite to each other, on the reverse and front surfaces of the aluminum foil, respectively. Meanwhile, if the thickness S of the aluminum foil composing the honeycomb core 28f is sufficiently smaller than the depth of penetration $\delta = 0.6$ mm, for example, if the thickness S is set to be 1/10 of the depth of penetration, the current densities Ia and Ib induced in the opposite directions on the reverse and front surfaces of the aluminum foil are negated with each other, and accordingly, the actually running current density I is the difference between the current densities Ia and Ib. Therefore, the current induced in the aluminum foil placed parallel to the magnetic field is nearly neglectable if the thickness of the aluminum foil is less than 1/10 the depth of penetration $\delta$, e.g., as small as 0.02 mm.

However, in the case where the honeycomb structure is created by attaching foils as in the present embodiment, the foils are doubled at two of the six sides of the hexagonal cell (unit structure). Therefore, the actual thickness of the aluminum foil at those two sides doubles. This fact should be taken into consideration when the thickness of the aluminum foil is determined.

Thus, as described above, although the aluminum honeycomb core 28f is interposed between the primary side core 7p and the secondary side core 7s of the boosting transformer 7, energy loss is hardly produced in the high frequency magnetic field at 20 KHz, and accordingly the boosting transformer 7 can fully operate.

The operation and function of the shield casing 28 of the magnetron 13 will now be described.

The unnecessary radiation leaking from the cathode stem 20 of the magnetron 13 is spread along the low frequency region as well as the 2450 MHz high frequency region. However, the shield casing 28 should do with the shielding effect only in the range of about 20 MHz through 20 GHz.

In the case of the 20 MHz frequency, the depth of the penetration $\delta$ of the aluminum foil composing the honeycomb core 28f is $1/\sqrt{1000}$ the value in the case of 20 KHz, that is, about 0.02 mm, which is equal to the foil thickness of the honeycomb core 28f according to the present embodiment In other words, when the frequency is over 20 MHz, the thickness of the aluminum foil composing the honeycomb core 28f becomes equal to or larger than the depth of penetration. Therefore, when the frequency is over 20 MHz, the aluminum foil having the thickness 0.02 mm shows the characteristic of a usual aluminum plate. Thus, if each of the cells constituting the honeycomb core 28f is regarded as a wave guide which displays a cut-off phenomenon to the leaked electromagnetic waves, the cell, showing the cut-off phenomenon, is said to have the shielding characteristic. On the other hand, in a higher frequency, according to the present embodiment, even when the largest frequency of the unnecessary radiation extends to 20 GHz, the cell size D is 1/5 the wavelength $\lambda = 15$ mm since the cell size D is set to be 3 mm, which is completely within the, shielding region. Therefore, the honeycomb core 28f can exhibit high shielding effects.

As can be understood from the foregoing description, in the construction of the microwave generating device, not only the shield casing 28 is able to prevent the unnecessary radiation from leaking from the cathode stem 20 of the magnetron 13, but the boosting transformer 7 can fulfill its function as a transformer although it is separated by the wall surface of the shield casing 28.

The thickness of a metallic foil composing the honeycomb core 28f is decided, as is clear from the above description, depending on electric characteristics such as the inverter frequency (20 KHz in the present embodiment), the lowest frequency of the unnecessary radiation to be shielded, and the efficiency of the boosting transformer, etc. However, considering the mechanical strength of the honeycomb core 28f, the optimum thickness is about 1/10–1/100 the depth of penetration at the inverter frequency.

In the meantime, when a magnetic metal is employed for the honeycomb core 28f, the honeycomb core 28f generates a branching circuit (shunt circuit) in the magnetic circuit of the boosting transformer 7, resulting a decrease of magnetic efficiency. Therefore, the honeycomb core 28f is preferably formed by a non-magnetic metal such as aluminum employed in the present embodiment. However, if nonmagnetic copper (Cu) or aluminum (Al) is used for the honeycomb core 28f, since the specific resistance (ohm.m) is small, the depth of penetration $\delta$ is small, giving rise to a processing problem. Therefore, the material of the honeycomb core 28f should be selected from the total viewpoint, with the above-described facts noted. For example, Monel metal, which is an alloy mainly composed of nickel and copper, is non-magnetic and, at the same time, relatively large in specific resistance, and accordingly, it can be said to be used suitably for the honeycomb core 28f.

In the above-described embodiment, the shielding wall is formed in the honeycomb structure, namely, by sticking metallic foils into hexagonal cells. However, the shielding wall for shielding electromagnetic waves is not restricted to be in the honeycomb structure.

In other words, the shielding wall may have a structure in which many through holes (cells) each having a polygonal cross section, for example, a triangular cross section, a square cross section or a hexagonal cross section pass through the shielding wall and are placed adjacent to each other having a wall surface in common. Of course such shielding wall as constructed in the above-described manner will function similarly as the shielding wall in the structure of the honeycomb.

Ventilation openings 28d and 28e are formed in the wall surface of the shielding casing 28 so as to cool the secondary side of the boosting transformer 7. It is so designed that the secondary side of the boosting transformer 7 is forcibly cooled by a cooling fan 2 from outside of the shield casing 28.

It goes without saying that the microwave generating apparatus according to the second embodiment operates exhibiting the same function and the same effects as the apparatus according to the first embodiment.

An electronic oven which is designed to act as an induction heating range will be described with reference to FIGS. 8 through 11. The construction of a stationary induction apparatus according to a third embodiment of the present invention is applied to an exciting coil of the electronic oven referred to above.

Figure 8:
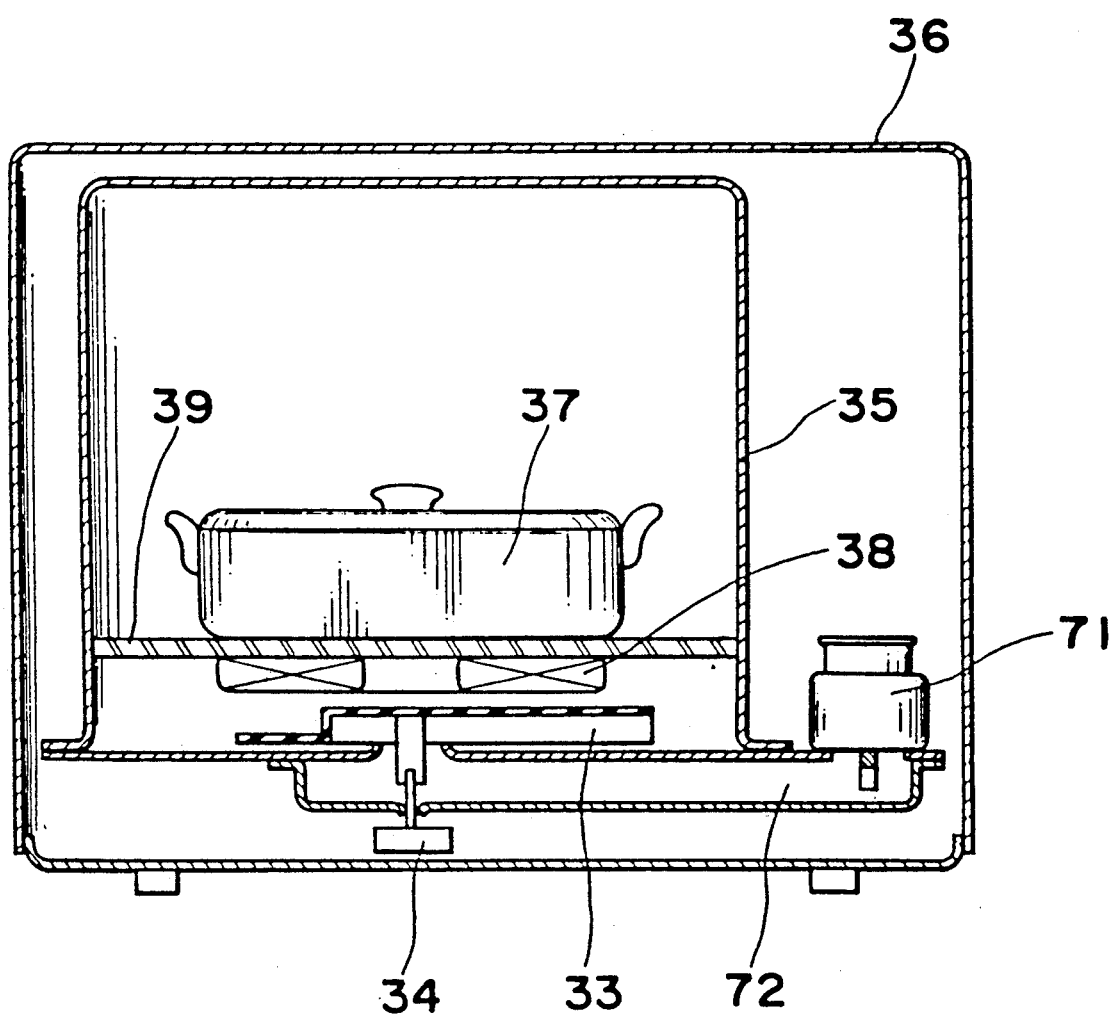
FIG. 8 is a cross sectional view of an electronic oven with an electromagnetic cooking apparatus in the construction of a stationary induction apparatus according to the present invention.

FIG. 8 shows a cross sectional view of an electronic oven functioned with an induction heating range to a heating coil portion of which is applied the structure of the stationary induction apparatus of the present invention. FIG. 9 shows an essential portion of FIG. 8, namely, the heating coil portion of FIG. 8, in detailed manner.

Referring to FIG. 8, microwaves (high frequency electromagnetic field) generated by a magnetron 71 are irradiated into a heating chamber 35 through a wave guide 72 and a rotary antenna 33. The rotary antenna 33, generally in a fan-like configuration, is rotated by a motor 34, so that the induction heating is uniformly carried out.

On the other hand, an exciting coil 38 is provided right over the rotary antenna 33, and a partition plate 39 made of a dielectric material such as a heat resisting ceramic plate or the like is placed so as to be almost in contact with the exciting coil 38. The partition plate 39 serves not only to protect the rotary antenna 33 and the exciting coil 38 in the bottom within the heating chamber 35, but to place an object 37 to be heated thereon.

Figure 11:
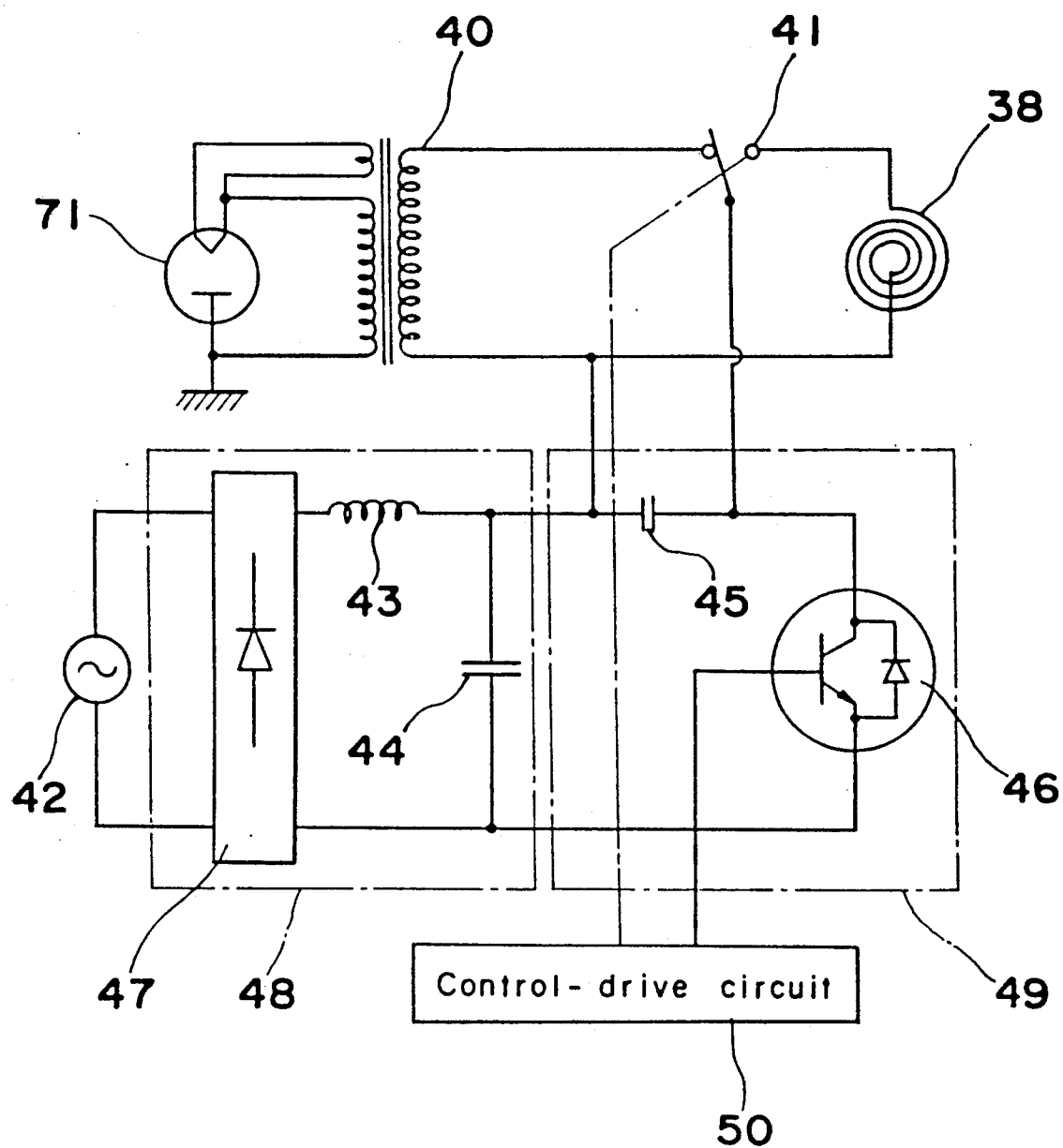
FIG. 11 is a circuit diagram showing the circuit construction of the electronic oven of FIG. 8.

The high frequency power is supplied to the boosting transformer for driving the magnetron 71 and to the exciting coil 38 by a circuit, e.g., shown in FIG. 11. The circuit of FIG. 11 includes a power source 42 of commercial frequencies, a smoothing circuit 48 comprised of a rectifier 47, an inductance 43 and a capacitor 44, an inverter circuit 49 comprised of a switching element 46 and a capacitor 45, and a controlling-driving circuit 50 which turns the switching element 46 on or off. The high frequency voltage at several tens of KHz produced by the controlling-driving circuit 50 is added either to the exciting coil 38 for induction heating or to the boosting transformer 40 of the magnetron 71 which is a source of microwaves of the dielectric heating, in accordance with switching of a switch 40.

Figure 9A:
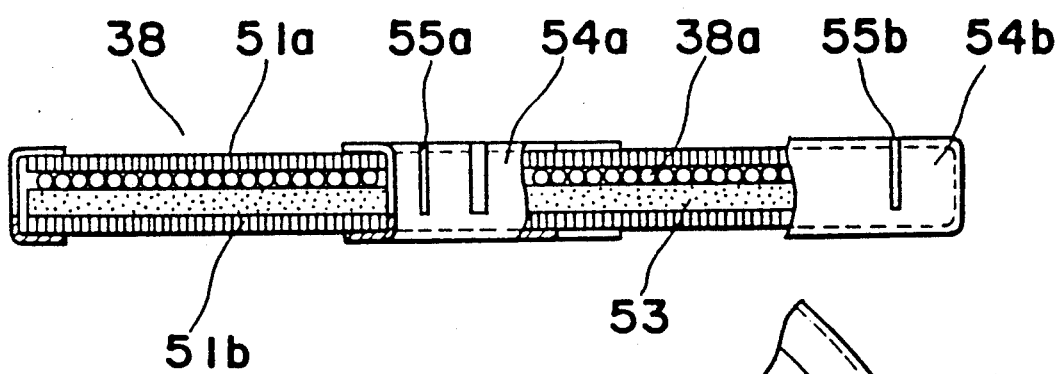
FIGS. 9(a) and 9(b) are enlarged views of an essential portion of the oven of FIG. 8.
Figure 9B:
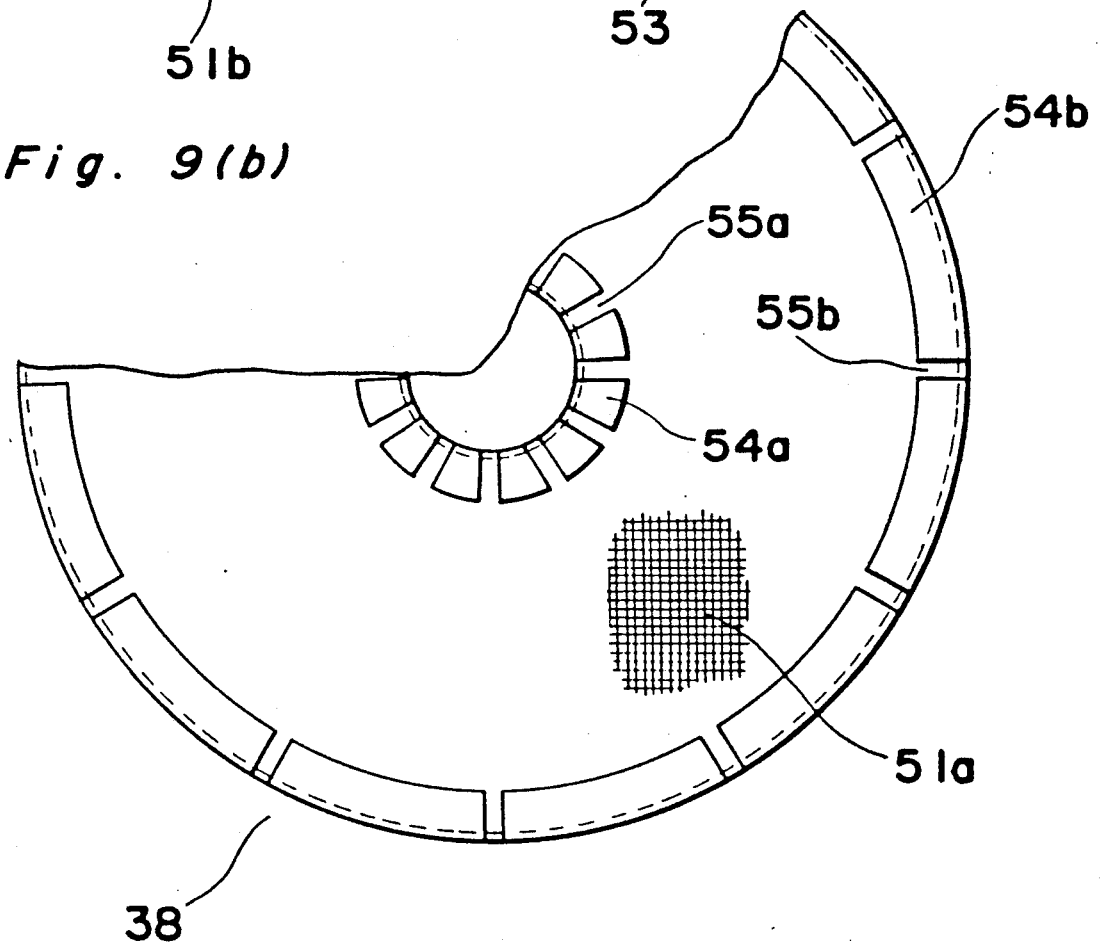

FIG. 9 is a detailed view showing the construction of the exciting coil 38 of FIG. 8; FIG. 9(a) being a broken view, and FIG. 9(b) being a plan view of FIG. 9(a). The exciting coil 38 in FIG. 9 is comprised of an exciting coil winding 38a having a winding wound into a flat board shape, a ferrite core 53 provided on the under surface of the exciting coil winding 38a for shielding of magnetism, aluminum honeycomb cores 51a and 51b in a perforated disc shape provided so as to hold both the exciting coil winding 38a and the ferrite core 53 from up and down and, shield rings 54a and 54b respectively in the inner peripheral side and the outer peripheral side of the aluminum honeycomb 25 cores 51a and 51b. The shield rings 54a and 54b are made of non-magnetic metallic plates. Moreover, the shield rings 54a and 54b have many slit holes 55a and 55b formed in a radial direction, thereby to hinder the flow of the induced current in a circumferential direction generated on the shield rings 54a and 54b and to prevent the loss and the temperature rise resulting from the heat generation.

Although the structure of the aluminum honeycomb cores 51a and 51b is the same as already described with reference to the second embodiment, the cell size D and the core height T of the cores 51a and 51b should be determined so that the 2450 MHz microwaves employed for dielectric heating can be sufficiently shielded, and also the distance between the exciting coil winding 38a and the object 37 to be heated is within the range possible for induction heating. Accordingly, in the third embodiment of the present invention, the core height T for both the cores 51a and 51b is 1.5 mm, with the cell size D is set to be approximately 3 mm.

The operation of the electronic oven equipped with the function of the induction heating range as configured above will be described below with reference to FIG. 10.

Figure 10A:
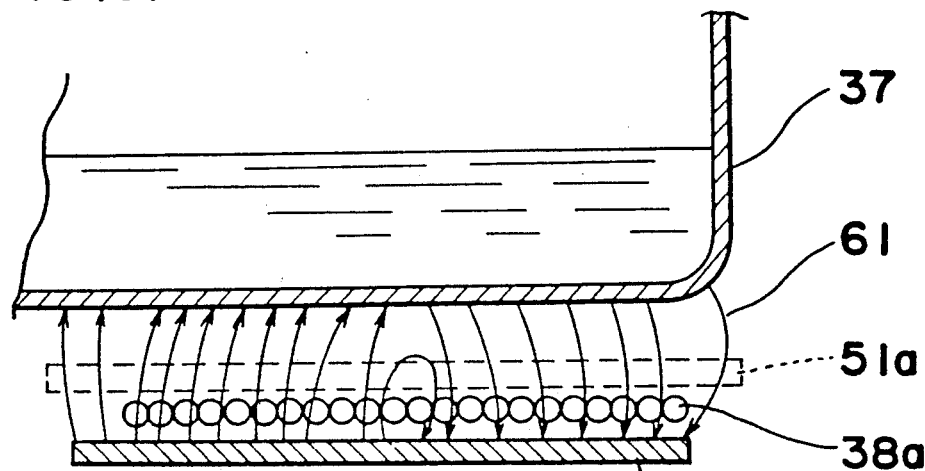
FIGS. 10(a) to 10(c) are diagrams showing the operation of the portion of FIG. 9.
Figure 10B:
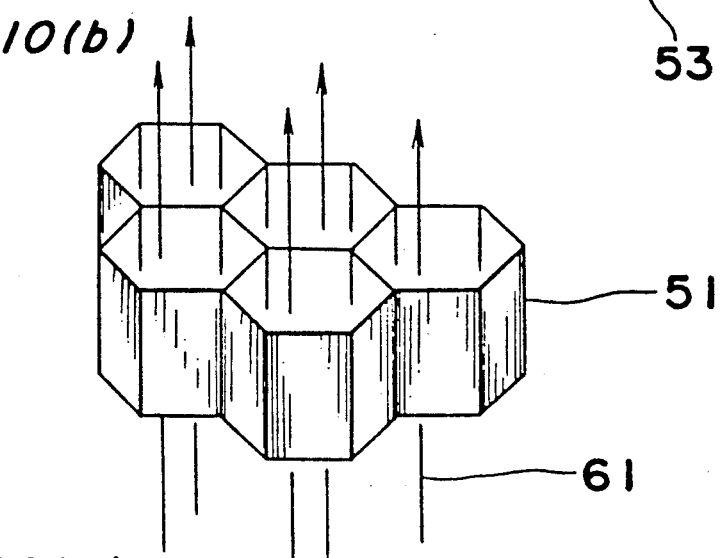
Figure 10C:
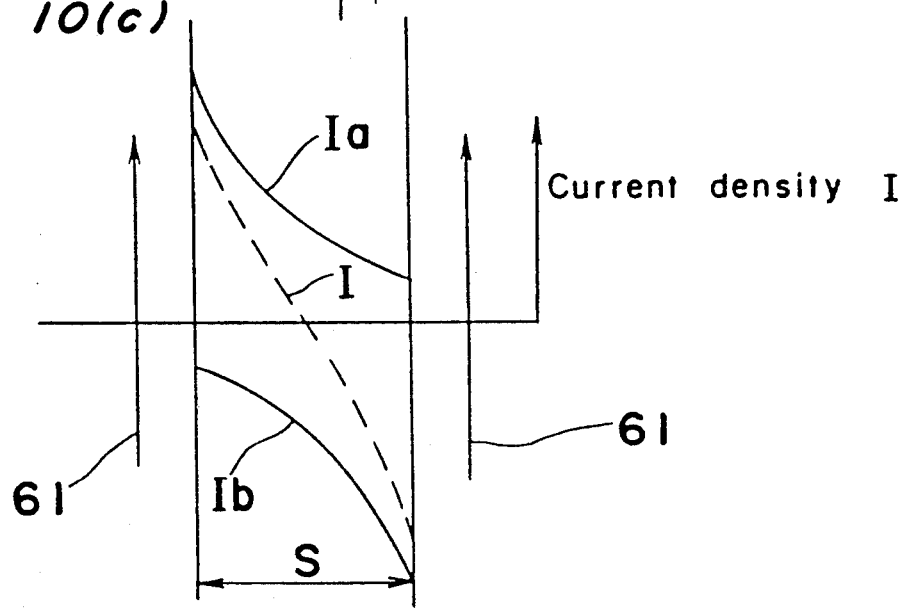

In FIG. 10(a), there is indicated the mutual relationship among the exciting coil winding 38a, the line of magnetic flux 61 showing the high frequency magnetic field generated by the exciting coil winding 38a, the metallic object 37 to be heated which is heated by the current induced in the high frequency magnetic field, the ferrite core 53 for shielding the leakage of the induced current below the high frequency magnetic field, and the aluminum honeycomb core 51a for preventing the exciting coil winding 38a from being heated by the high frequency waves, that is, 2450 MHz microwaves for dielectric heating, or from discharging. Since the honeycomb core 51a interposed between the exciting coil winding 38a and the object 37 to be heated has the cell size D small enough with respect to the wavelength of the high frequency electromagnetic field microwaves) at 2450 MHz, each of the cells of the honeycomb core 51a can be regarded as a wave guide, and therefore the honeycomb core 51a can display high shielding effects (with respect to 2450 MHz) due to the similar effects as obtained of the cut-off phenomenon by the wave guide. Meanwhile, the relation between the high frequency magnetic field 61 in the 20 KHz frequency used for induction heating and the honeycomb core 51a shown in FIG. 10(a) is enlarged in FIG. 10(b). The line 61 of magnetic force of the high frequency magnetic field is generally parallel to the axis direction of the cells composing the honeycomb core 51a.

Consequently, for the same reason as in the second embodiment, the honeycomb core 51a hardly produces any loss with respect to the 20 KHz high frequency magnetic field, although the honeycomb core 51a is intervened between the object 37 to be heated and the exciting coil winding 38a. The honeycomb core 51a works to shield (protect) the exciting coil winding 38a from the 2450 MHz high frequency electromagnetic field, i.e., microwaves.

Since the aluminum honeycomb core 51b completely covers the ferrite core 53, such disadvantage is solved that the ferrite core 53 absorbs the microwaves and generates heat.

Although the above description is made on the assumption that the honeycomb core is made of an aluminum foil, naturally, it is not restricted to the aluminum foil. However, a non-magnetic metal is better since a branching circuit is not formed in the non-magnetic metal in the high frequency magnetic field.

In addition, the aluminum honeycomb core is employed in the upper and lower surfaces of the exciting coil winding, and the inner and outer peripheral surfaces of the honeycomb core are constituted by a non-magnetic metal such as aluminum, but, the employment of the honeycomb core is not limited to the range of the present embodiment.

Moreover, such advantageous characteristics of the honeycomb structure as good gas permeability and light weight can be fully utilized. Particularly, the good gas permeability of the honeycomb structure is effective to control the temperature rise of the exciting coil winding 38a.

Accordingly, the application of the structure of the stationary induction apparatus of the present invention to the exciting coil will bring about the following effects.

(1) Since the honeycomb coil winding is covered with the honeycomb core made of a metallic foil, the exciting coil winding can be prevented from generating heat or discharging by the influences of the microwaves, and at the same time, the high frequency magnetic field for induction heating generated by the exciting coil winding can reach the object to be heated without being attenuated, so that the generation of heat in the exciting coil at the induction heating time can be inhibited, while maintaining high heating efficiency.

(2) Furthermore, although it is natural, the honeycomb core has gas permeability, and accordingly, is effective to cool the exciting coil, so that the discharging of the heat can be effectively performed.

(3) The honeycomb core also covers the ferrite core below the exciting coil winding for shielding of the magnetism, and therefore, the ferrite core is prevented from absorbing the microwaves and generating heat.

Due to the above-described advantages, a high frequency heating apparatus capable of induction heating and dielectric heating, which has not been believed previously to be practical, can be realized, with the exciting coil for induction heating provided within the heating chamber for dielectric heating, through application of the structure of the stationary induction apparatus according to the present invention to the induction heating coil of the apparatus.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A transformer comprising a primary coil winding, a secondary coil winding, and a wave shielding wall provided between the primary coil winding and secondary coil winding and having an external shape constructed by plates of metal, the plates being provided with numerous through holes each disposed vertically relative to a plane of one of the plates and having a cross-section defining a polygon, each through hole being arranged at a position adjacent to at least one other in an arrangement of a common wall plate being formed at a front and rear sides as wall planes, the thickness of the plates constructing the wall planes of each of the through holes being provided in a dimension of less than about one tenth a depth of penetration of an electromagnetic wave with respect to an employed frequency of the transformer to be determined in relationship with the material of the plates.

2. The transformer as defined in claim 1, wherein the wave shielding wall is formed as a honeycomb configuration of numerous through holes each having a cross-section defining a hexagon, and is comprised of bonded sheets of metal film.

3. The transformer as defined in claim 2, wherein the wave shielding wall is made of a non-magnetic metal including one of aluminum and Monel.

4. The transformer as defined in claim 3, wherein the wave shielding wall is provided on at least a portion of a metal surface thereof with a material of induction including resins.

5. The transformer as defined in claim 2, wherein the wave shielding wall is provided on at least a portion of a metal surface thereof with a material of induction including resins.

6. The transformer as defined in claim 1, wherein the wave shielding wall is made of a non-magnetic metal including one of aluminum and Monel.

7. The transformer as defined in claim 6, wherein the wave shielding wall is provided on at least a portion of a metal surface thereof with a material of induction including resins.

8. The transformer as defined in claim 1, wherein the wave shielding wall is provided on at least a portion of a metal surface thereof with a material of induction including resins.

9. A high frequency heating apparatus comprising a magnetron for generating micro waves, an inverter circuit for converting the electric power of a commercial frequency into an electric power of a high frequency of more than several KHz, and a boosting transformer for boosting the electric power of the high frequency to supply the magnetron, the boosting transformer including a primary coil for loading the electric power of the high frequency from the inverter circuit, a pair of secondary coils of a high voltage and a low voltage for supplying respectively an anode voltage and a heater voltage of the magnetron, the magnetron including an oscillating tube provided with a cathode stem at one end thereof and a shield case for covering the cathode stem, the shield case being formed as a wave shielding wall at least a portion of wall planes thereof, and the primary coil and secondary coil of the boosting transformer provided facing each other at internal and external sides of the wave shielding wall, the boosting transformer having an external shape constructed by plates of metal, the plate being provided with numerous through holes each disposed vertically relative to a plane of one of the plates and having a cross-section defining a polygon, the through holes being arranged adjacent to each other in the arrangement of a common wall plate being formed at the front and rear sides as wall planes, a thickness of the plates constructing the wall planes of each of the through holes being provided in a dimension of less than about one tenth a depth of penetration of an electromagnetic wave with respect to an employed frequency of the transformer to be determined in relationship with the material of the plates.

10. The heating apparatus as defined in claim 9, wherein the wave shielding wall of the boosting transformer is formed as a honeycomb structure in which each of the through holes have a cross-section defining a hexagon, and is comprised of bonded sheets of metal film.

11. The heating apparatus as defined in claim 10, wherein the wave shielding wall of the boosting transformer is made of a non-magnetic metal including one of aluminum and Monel.

12. The heating apparatus as defined in claim 11, wherein the wave shielding wall of the boosting transformer is provided on at least a portion of a surface thereof with a material of induction including resins.

13. The heating apparatus as defined in claim 10, wherein the wave shielding wall of the boosting transformer is provided on at least a portion of a surface thereof with a material of induction including resins.

14. The heating apparatus as defined in claim 9, wherein the wave shielding wall of the boosting transformer is made of a non-magnetic metal including one of aluminum and Monel.

15. The heating apparatus as defined in claim 14, wherein the wave shielding wall of the boosting transformer is provided on at least a portion of a surface thereof with a material of induction including resins.

16. The heating apparatus as defined in claim 9, wherein the wave shielding wall of the boosting transformer is provided on at least a portion of a surface thereof with a material of induction including resins.

* * * * *